H. M. UNDERWOOD.
Hand-Trucks.

No. 158,610.

Patented Jan. 12, 1875.

Witnesses:
Will. H. Dodge
Wm. E. Chaffee

Inventor:
Henry M. Underwood
By his Atty's
Dodge & Son

UNITED STATES PATENT OFFICE.

HENRY M. UNDERWOOD, OF KENOSHA, WISCONSIN.

IMPROVEMENT IN HAND-TRUCKS.

Specification forming part of Letters Patent No. 158,610, dated January 12, 1874; application filed June 16, 1874.

*To all whom it may concern:*

Be it known that I, HENRY M. UNDERWOOD, of Kenosha, in the county of Kenosha and State of Wisconsin, have invented certain Improvements in Cant-Hook Attachments for Hand-Trucks, of which the following is a specification:

My invention relates to a device to be put upon the market and sold for attachment to the common hand-trucks used in mercantile houses; and it consists in a hook and chain for canting boxes, barrels, &c., over upon the truck, in order to save time and labor in loading, and dispense with the assistant often required.

Figure 1:
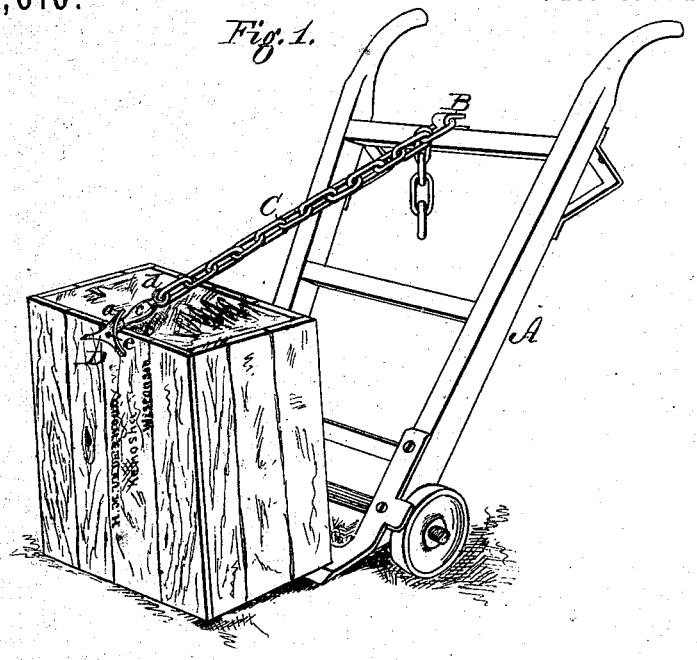
Figure 2:
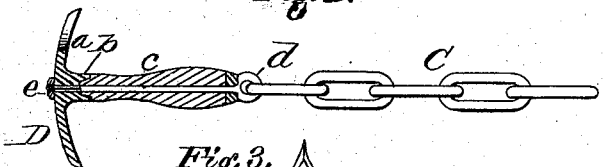
Figure 3:
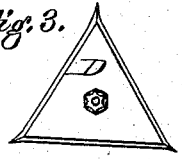

Figure 1 is a perspective view of a truck having my attachment applied and in use; Fig. 2, a central section through the hook; Fig. 3, an outside face view of the hook; and Fig. 4, a side view of the dog or catch by which the chain is secured on the truck.

In the drawing, A represents a common hand-truck, such as is used in all mercantile houses for moving boxes, bales, barrels, &c., having two handles, two small wheels at the lower end, and a lip or nose to engage under and lift the object to be carried. In order to carry boxes and the like, it is necessary, after pushing the lip of the truck under them, to tip them over upon the face of the truck. This is often a troublesome and laborious operation, and when the object is a heavy one the assistance of a second man is frequently necessary. My object is to produce a cheap and simple attachment which will enable the operator to cant the boxes, &c., over with ease and quickness, which may be readily attached to all the common trucks now in use, and which shall occupy little space, be free from objection and inconvenience, and be readily detachable. I am aware that several attempts have been made to produce a cant-hook for use on these trucks, but so far, such devices produced have been objectionable for one reason or another.

Figure 4:

My device consists, simply, of a common chain, C, having attached to one end a triangular hook or plate, D, and of a dog or hook, B, which is attached to the upper cross-bar of the truck, at its middle, to receive and hold one end of the chain. The dog or hook is bent as shown in Fig. 4, in order to clasp around the cross-bar and relieve the screw by which it is held in place from strain. The chain may be of any suitable construction, having flat links, and the hook D, on its end, may be varied in form and construction, as desired. I prefer, however, to make the hook, as shown, of a triangular plate having its corners bent slightly inward and well sharpened, as shown. To the center of the plate or hook I secure a rigid handle, $c$, to which the chain is attached. The plate is made with a central socket, $b$, on its inner side, and into this socket is inserted one end of the wooden handle $c$. An eyebolt, $d$, is passed centrally through the handle and the plate or hook, and has a nut, $e$, applied to its end on the outside of the plate. The eyebolt serves to hold the handle to the plate, and also as a means by which to attach the chain, as clearly shown in Fig. 2. The handle serves as a means by which to hold the hook or plate, and by which to drive the corner of the same into the box or other object when required. Being of wood the handle may be used without inconvenience in the coldest weather.

In applying my attachment to the common truck, the dog or hook B is secured to the middle of the upper cross-bar of the truck, as shown, and the chain hooked fast thereon, at any desired link.

When a box or other object is to be placed on the truck, the nose of the latter is inserted under the object, the hook D then engaged over or into the same, and then the chain shortened up by hooking the proper link on the dog or hook B, as shown in Fig. 1, whereupon the operator can easily tilt the object over upon the truck by bearing down upon the handles. By hooking the chain up or letting it out the hook is readily adjusted for grasping objects of different sizes and forms.

When not required for use it is readily detached and laid aside in a small space, or suspended out of the way under the upper end of the truck. The chain admits of objects being held which could not be with a rigid hooked bar.

Having thus described my invention, what I claim is—

1. In combination with the hand-truck having the hook B attached, the adjustable and detachable chain C, having the hook D attached to its free end, as set forth.

2. In combination with the chain C, the hook consisting of the flat plate $a$, the wooden handle $c$, and the eyebolt $d$, as set forth.

HENRY M. UNDERWOOD.

Witnesses:
CHAS. FRANTZ,
ALFRED CURTIS.